US006480718B1

United States Patent
Tse

(10) Patent No.: US 6,480,718 B1
(45) Date of Patent: Nov. 12, 2002

(54) AUTOMATIC FREQUENCY PLANNING FOR A WIRELESS NETWORK

(75) Inventor: Paul Chan Ho Tse, Allen, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/351,342

(22) Filed: Jul. 12, 1999

(51) Int. Cl.[7] ............................................. H04Q 7/36
(52) U.S. Cl. ..................... 455/446; 455/423; 455/437; 455/447
(58) Field of Search ..................... 455/65, 67.1, 67.3, 455/295, 296, 423, 437, 450, 451, 452, 453, 501, 503, 446, 447

(56) References Cited

U.S. PATENT DOCUMENTS

| 5,134,709 A | * | 7/1992 | Bi et al. ..................... 455/452 |
| 5,157,709 A | * | 10/1992 | Ohteru ......................... 370/329 |
| 5,206,488 A | | 4/1993 | Teicher ........................ 235/380 |
| 5,432,843 A | | 7/1995 | Bonta ........................... 379/60 |
| 5,594,949 A | * | 1/1997 | Andersson et al. ......... 370/329 |
| 5,603,092 A | * | 2/1997 | Stjernholm .................. 455/423 |
| 5,648,955 A | | 7/1997 | Jensen et al. ................ 370/252 |
| 5,701,585 A | * | 12/1997 | Kallin et al. ................ 455/422 |
| 5,946,612 A | * | 8/1999 | Johansson .................... 455/405 |
| 5,966,657 A | * | 10/1999 | Sporre ......................... 455/425 |
| 6,023,459 A | * | 2/2000 | Clark et al. ................. 370/329 |

* cited by examiner

Primary Examiner—Dwayne Bost
Assistant Examiner—Miguel D. Green
(74) Attorney, Agent, or Firm—Haynes and Boone, LLP

(57) ABSTRACT

A system and method for automatic frequency planning in a wireless communications network is disclosed. The method determines frequency isolation between a first and second cell of the wireless communication network. The method broadcasts a first frequency in the first cell and a second frequency in the second cell. A mobile unit operating in the first cell measures both the first and second frequencies and reports the measurements using a mobile assisted handoff (MAHO) procedure. In some embodiments, the mobile unit repeatedly measures and reports the first and second frequencies. The difference between the first and second frequency is stored in an isolation matrix and analyzed to determine the frequency isolation.

23 Claims, 3 Drawing Sheets

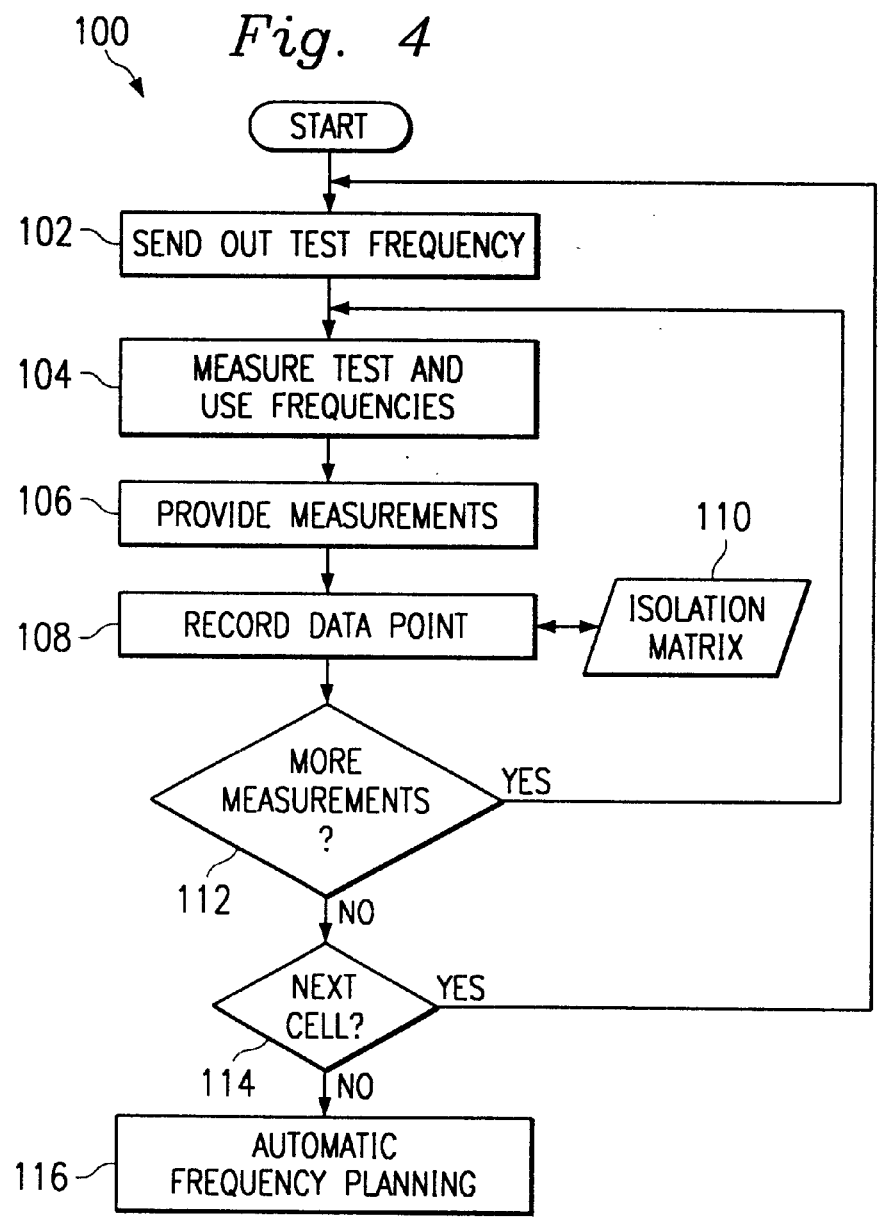

AUTOMATIC FREQUENCY PLANNING FOR A WIRELESS NETWORK

TECHNICAL FILED

This invention relates generally to management techniques for a wireless communications network and, more particularly, to a system and method for determining frequency allocation in a multi-frequency wireless network.

BACKGROUND

There are many types of multiple-frequency mobile network technologies, including global systems mobile ("GSM"), time division multiple access ("TDMA"), and advanced mobile phone service ("AMPS"). Even common frequency technologies like code division multiple access ("CDMA") often use multiple frequencies for linking different areas of telecommunication traffic. Likewise, there are many types of packet data technology that are being implemented with these mobile network technologies. For example, global packet radio services ("GPRS") and enhanced data rate for GSM evolution ("EDGE") technologies are being developed to implement packet data technology for GSM and TDMA networks, respectively. For these technologies, it is important to utilize all the available bandwidth in order to maximize the efficient use of the network.

Consider for example a TDMA network where different frequency channels, referred to as simply "frequencies," are reused as often as possible for spectrum efficiency, but limited by the need to avoid interference and/or crosstalk. Simplistically, a most efficient use of frequencies would be similar to a map, where two adjacent cells never use the same "color" on the map. In real life, however, frequencies from one cell can often be "seen" even at non-adjacent cells. For example, several nonadjacent cells located in a valley-type land formation may not be able to use the same frequency because of the inherent physical characteristics of the valley, despite the fact that the cells are not adjacent or otherwise sufficiently separated. In another example, cells that are close but not adjacent in a downtown area with many tall buildings may allow frequent reuse of a frequency due to the blocking character of the tall buildings.

In furtherance of the TDMA network example, for a given cell, there is a certain radio frequency ("RF") isolation limit (e.g. 17 dB) between a frequency in that cell and a frequency in another cell. Therefore, a particular frequency can be used in the given cell if that cell's use of the frequency is 17 dB stronger than any residual use of the same frequency by another cell. If the frequencies are less than 17 dB apart, the caller will experience excessive interference or cross talk.

A simplistic solution to the frequency planning problem is to prepare fixed frequency plans for a predetermined number (a cluster) of cells. Common cluster sizes are seven or eleven cells, which are generic enough to work on a lot of different systems and different geographic layouts. The frequency reuse is scheduled for each cluster and then the cluster is repeated throughout the network.

A problem with the fixed frequency plans is that because they are generic to many different environments, they do not promote efficient frequency reuse. Also, there may be some environments that still experience significant crosstalk.

Referring to FIG. 1, a solution for the above identified problem is to generate an isolation matrix 6 for every cell or cell partition (which may be further divided into cell sectors—hereinafter simply referred to as "cell") in the network. The isolation matrix 6 specifies the frequency isolation of a cell from every other cell in the network. A demand matrix 7 can also be used to designate high-use cells (e.g., in downtown areas) from low-use cells (e.g., in rural areas). An automatic frequency planning system 8 may then take the isolation and demand matrices and determine the appropriate frequency plan among the cells in the network.

One way to populate the isolation matrix 6 is to set up a transmitter in one cell and then move around a test cell with a measuring device. Typically, a test vehicle is outfitted with a receiver and measuring device to roam around the test cell and obtain measurements. Once the test cell has been covered, the isolation between the two cells can be determined.

This solution has many problems. First of all, it is not uncommon that the test procedure has errors associated with manual or human intervention. Secondly, the test vehicle may not sufficiently cover the test cell. Thirdly, it is difficult and expensive to repeat this process in a large network to account for changes in the environment.

Therefore, it is desired to have a more accurate system and method for deriving an isolation matrix for a given network.

It is further desired to have a system that can be easily repeated to accommodate changes in a network's environment.

It is still further desired to have a highly accurate isolation matrix that is not dependent on mechanical or human performance.

SUMMARY

In response to the problems and needs described above, provided is a system and method for creation of an isolation matrix for automatic frequency planning in a wireless communications network. In one embodiment, the method automatically determines frequency isolation between a first and second cell of the wireless communication network. The method broadcasts a first frequency in the first cell and a second frequency in the second cell. A mobile unit operating in the first cell measures both the first and second frequencies and report the measurements to a computing center. In some embodiments, the mobile unit repeatedly measures and reports the first and second frequencies. The difference between the first and second frequency is computed and analyzed to determine the frequency isolation.

In some embodiments, the measurement difference(s) are stored in an isolation matrix for statistical analysis.

In some embodiments, the method is used with a plurality of mobile units, thereby increasing the number of provided measurements.

In some embodiments, the mobile unit may measure the strength of the first and second frequencies using a mobile assisted handoff method. The first frequency may be the actual carrier servicing the mobile unit's call in the first cell. The mobile unit may then report the measurements using a channel quality message. A plurality of channel quality messages may be collected.

A benefit of the present invention is that it provides a more accurate system and method for deriving an isolation matrix for a given network.

Another benefit of the present invention is that it provides a system that can be easily repeated to accommodate changes in a network's environment.

Yet another benefit of the present invention is that it provides an accurate isolation matrix that is not dependent on mechanical or human performance.

Yet another benefit of the present invention is that it relies on existing measurement mechanisms available in IS-136 TDMA and GSM cellular networks.

Yet another benefit of the present invention is that measurements are taken from actual calls serviced by each cell, therefore the portions of the cell's coverage area included in the isolation matrix data is automatically representative of the traffic patterns of the cell.

BRIEF DESCRIPTION OF THE DRAWINGS

FIG. 4 is a flow chart of a method for use in the TDMA network of FIG. 2.

DETAILED DESCRIPTION

The following disclosure provides many different embodiments, or examples, for implementing different features. Techniques and requirements that are only specific to certain embodiments should not be imported into other embodiments. Also, specific examples of networks, components, and messages are described below to simplify the present disclosure. These are, of course, merely examples and are not intended to limit the invention from that described in the claims.

Figure 2:
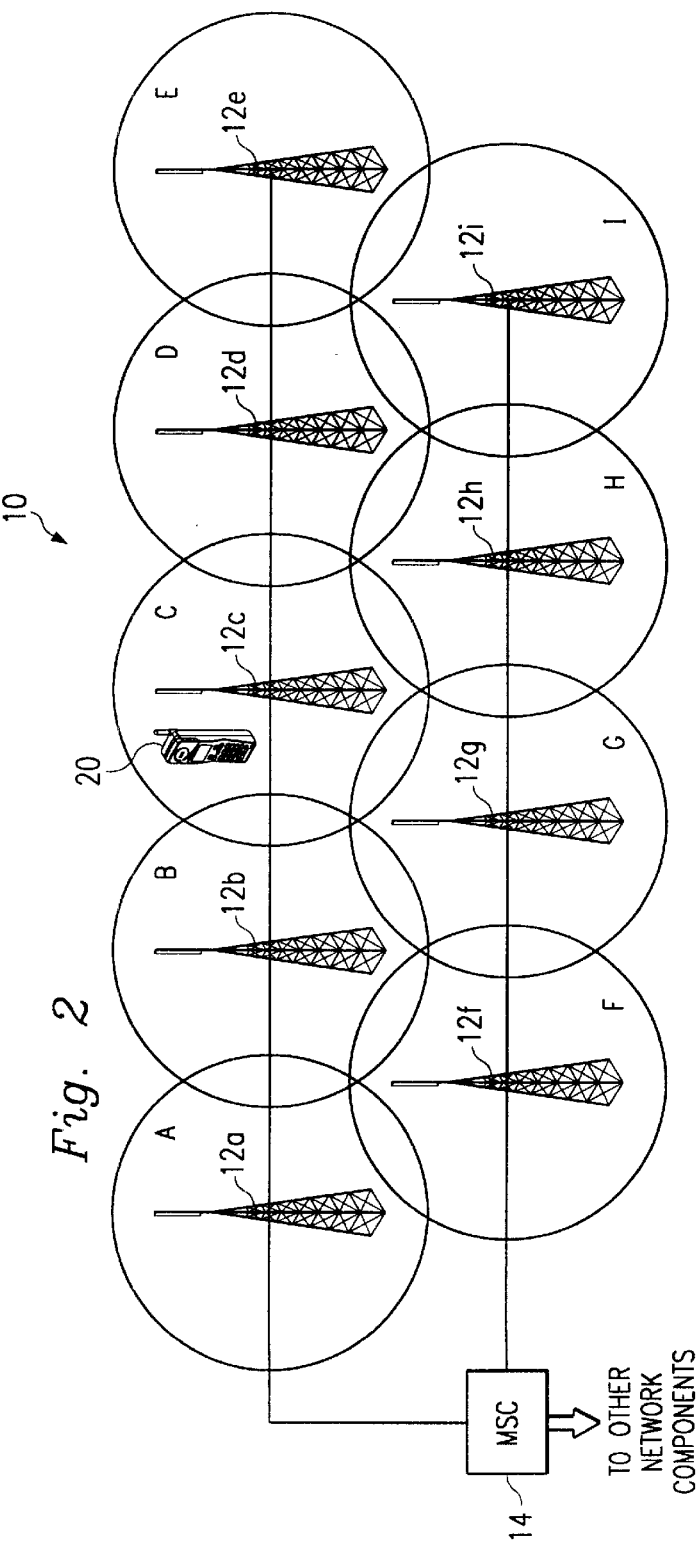
FIG. 2 is a schematic block diagram of a simplified TDMA network.

Referring now to FIG. 2, a TDMA network 10 provides a simplified environment for a example of how one embodiment of the present invention can be utilized. It is understood, however, that the configuration of FIG. 2 is meant merely for example and leaves out certain details well known by those of ordinary skill in the art.

The network 10 is subdivided into various cells or "sites." In the present simplified environment, there are eight cells: A, B, C, D, E, F, G, H and I. Each of the cells A–I include a base station controller and antenna ("BSC") 12a–12i, with each individual BSC designated with the suffix that corresponds with the cell A–I that it serves. All of the BSC's 12a–12i are further connected to a mobile switching center ("MSC") 14. It is understood that the connection to the MSC 14 may be wired, microwave, or other similar connection and that the MSC 14 may be representative of several different MSC's.

The cells A–I each utilize specific, predetermined channels or frequencies for carrying voice and data traffic to and from a mobile unit 20. Although the mobile unit 20 is illustrated in the cell C, the present discussion contemplates that the mobile unit moves around the network 10. Each BSC operates with one or more predetermined frequencies. The frequencies are spaced apart from one another by 30 kHz (for the IS-136 TDMA system; other systems may have different frequency spacings for which this invention also applies). Adjacent cells cannot "reuse" the same frequency. For example, the BSC 12c cannot use the same frequency as BSCs 12b, 12g, 12h, and 12d.

When traveling between the cells A–I, the mobile unit 20 utilizes a mobile assisted handoff (MAHO) method for transferring from a frequency of a "serving" BSC to a frequency of a "target" BSC. Specifically, the EIA/TIA Interim Standard IS-136 specifies the MAHO functionality in a TDMA network. In an IS-136 type of system, the mobile unit 20 is provided with a list of candidate base stations. At intermittent times, the mobile unit 20 will measure a signal quality parameter of transmissions from the listed candidate base stations. The quality parameter may be received signal strength (RSSI), or other appropriate parameter such as energy per chip per total noise (EC/IO), bit error rate (BER), frame erasure rate (FER), or color code.

There are two types of frequencies upon which the mobile unit 20 performs signal measurements: (a) a currently assigned forward digital traffic frequency channel, and (b) any other specified forward frequency channel(s). In the present example, the digital traffic frequency channel has a TDMA format having six time slots that occur within a 40 millisecond frame. These measurements are gathered to determine a preferred list of target base stations and, when directed, the preferred list is reported to the MSC 14, by way of the BSC currently serving the mobile unit 20. The mobile unit 20 subsequently reports the measurements to the serving BSC with a Channel Quality Message ("CQM") report, which forwards the CQM to the MSC 14. The MSC 14 then selects the target base station and directs the handoff accordingly.

The mobile unit 20 also measures the RSSI of one entry of a received Measurement Order Channel List during an idle time slot at 20 millisecond (½frame) intervals. The mobile unit 20 can actually measure up to 24 different frequencies. For example, if the mobile unit 20 is in cell C and being served by BSC 12c, and the frequencies associated with BSCs 12b and 12g are included within the Measurement Order Channel List, the mobile unit 20 will retune its receiver during an idle time slot to the frequency used by the BSC 12b, measure the RSSI, and then retune its receiver during another idle time slot to the frequency used by the BSC 12g and make another RSSI measurement. The resulting RSSI measurements are reported to the serving BSC 12c in increments of 2 dBm within a range of –113 dBm, or less, to –51 dBm or greater. The various measurements and estimates made by the mobile unit 20 are normally employed to determine the target base station to which the mobile unit 20 will be assigned during a handoff procedure.

There are a number of variations within these basic handoff procedures. For example, a "soft" handoff occurs when the target BSC starts serving the mobile unit 20 before the serving BSC discontinues service. There is also a softer handoff which is a soft handoff between two sectors within the same cell. In the present example, each of the BSCs 12c and 12g have antennas arranged to serve one of three sectors (sectors "X", "Y", and "Z"). In addition, the term "handover" is often substituted for the term "handoff" in certain geographic areas such as Europe.

Typically, when a mobile is set up in a call, it is given a list (e.g., preferred base site list) of frequencies to measure. It will then make the above-described measurements and reports these back every second in a set of CQMs. The CQMs are received every second at the BSC. The BSC may forward these or process them directly for handoff determination. In the present embodiment, the measurements are further used for data points that are processed to feed into the isolation matrix.

Although not explicitly shown, the cells A–I are situated in a physical environment. The physical environment directly influences the reuse of frequencies possible in the network 10. For example, the cells A–I could be in a valley type environment where there is a literal line of sight between cell A and cell E and hence frequencies can not be reused as often. Alternatively, the cells A–I can be in a downtown environment, having many tall buildings with almost no direct line of sight between the cells. In the downtown environment, frequencies may be reused more frequently.

Figure 1:
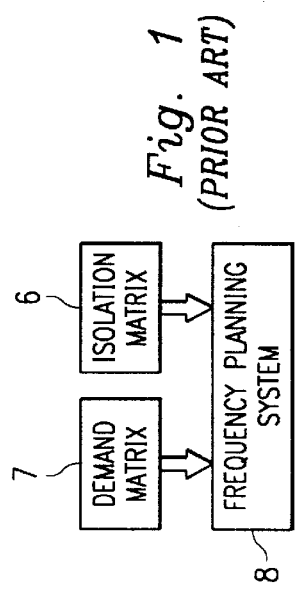
FIG. 1 is a block diagram of a prior art isolation matrix and demand matrix for use in a frequency planning system.

It is desired to provide an isolation matrix for a frequency planning system, similar to the frequency planning system 8 of FIG. 1, that accommodates each of the potential environments of the network 10. It is also desired that the frequency system be automatic and not require human or mechanical interaction in data gathering. It is further desired that the isolation matrix be updated regularly for changes in the environment, such as when a building is built or demolished or to account for seasonal changes in foliage. The automatic frequency planning system should reuse frequencies as often as possible in order to increase the amount of traffic that can be carried by the cellular network in general.

Figure 3:
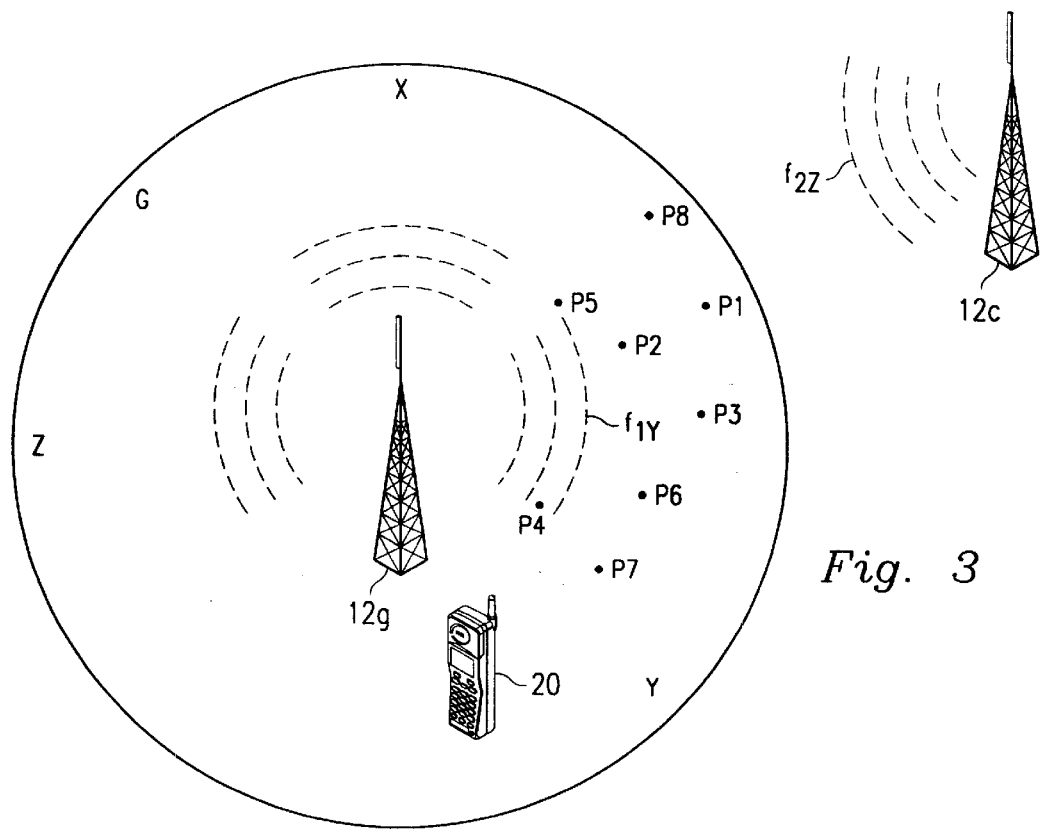
FIG. 3 is a serving cell of the TDMA network of FIG. 2 and a transmitter for a test frequency in a non-adjacent cell.

Referring now to FIG. 3, in furtherance of the above example, the cell G and BSC 12g will be shown in greater detail to describe how an improved isolation matrix can be generated for the network 10. A second transmitter, for example BSC 12c, is also shown in FIG. 3. One sector (sector Y) of the BSC 12g utilizes a first frequency $f_{1Y}$ and one sector (sector Z) of the BSC 12c utilizes a second frequency $f_{2Z}$. It is understood, however, that different sector and antenna arrangements can also be employed.

Referring also to FIG. 4, a method 100 is used by the network 10 to provide an isolation matrix. Although not shown, the method 100 may, for example, be run by a processing center connected by a data channel to the MSC 14. In the following description of the method 100, the example shown in FIG. 3 will be discussed to better clarify the method. In the example, the mobile unit 20 is active in the cell G, specifically in the sector of cell G served by the frequency $f_{1Y}$.

At step 102, a unique test frequency is broadcast from a single test cell in the network. In the example of FIG. 3 above, the BSC 12c broadcasts a frequency $f_{2Z}$. The frequency $f_{2Z}$ is, in the present example, a unique test frequency that is not currently being used to service any mobile units in the cell G. In some embodiments, frequency $f_{2Z}$ may be a unique to the entire network 10 used solely, at the present instant, for purposes of the method 100.

At step 104, the mobile unit in a serving sector receives and measures the test frequency as well as a serving frequency from the BSC of the serving sector. In the present example, the mobile unit 20 is at a location P1 and is currently being served by the frequency $f_{1Y}$. The mobile unit 20 receives and measures the RSSI for the frequencies $f_{1Y}$ and $f_{2Z}$. It is understood, however, that different measurements, such as EC/IO, bit error rate, or frame erasure rate may also be measured.

At step 106, the mobile unit provides the measurements for the test frequency and the serving frequency to a processing component. In the present example, the mobile unit 20 reports the measurements for the frequencies $f_{1Y}$ and $f_{2Z}$ in a CQM to the BSC 12g, which forwards the CQM to the MSC 14. In one embodiment, the MSC 14 is the final processing component for the CQM, while in other embodiments, the CQM may be delivered to a separate processing component (not shown). It is understood that the format and protocol of the CQM may change as it moves from one component to the next. It is also understood that one or more of the intervening components may add or remove data from the CQM, as necessary.

At step 108, an isolation datapoint is recorded in an isolation matrix. In the present example, the measurements from the CQM regarding frequencies $f_{1Y}$ and $f_{2Z}$ are recorded in an isolation matrix 110. For further example, if the RSSI for frequencies $f_{2Z}$ is −85 dBm and the RSSI for frequencies $f_{1Y}$ is −78 dBm, then an isolation datapoint:

$$CZ:GY=7 \text{ dB} \quad (1)$$

is recorded into the isolation matrix 110.

As stated above, the mobile unit has the ability to measure and record multiple frequencies. Therefore, multiple isolation datapoints may be simultaneously obtained. For example, the mobile unit 20 may also measure a third unique test frequency $f_{3Z}$ (not shown) from the BSC 12d (FIG. 2). The CQM from the mobile unit 20 may then include measurement data for the third frequency $f_{3Z}$. In furtherance of the above example, if the RSSI for frequency $f_{3Z}$ is −95 dBm, then an isolation datapoint:

$$DZ:GY=17 \text{ dB} \quad (2)$$

is also recorded into the isolation matrix 110.

At step 112, a determination is made if more measurements are to be taken for the current test frequency(ies). More measurements can be taken at random or predetermined time intervals to fill the isolation matrix 110 with isolation datapoints. If so, execution returns to step 104. In the present example, within the next second the mobile unit 20 moves to a location P2 while still being served by the frequency $f_{1Y}$. The mobile unit 20 receives and measures the RSSI for the frequencies $f_{1Y}$ and $f_{2Z}$ again and at step 106 provides these measurements to the MSC 14. At step 108, more isolation datapoints are added to the isolation matrix. For further examples, if the RSSI for frequencies $f_{2Z}$ is −86 dBm, the RSSI for frequency $f_{3Z}$ is −96 dBm and the RSSI for frequencies $f_{1Y}$ is −77 dBm, then the isolation datapoints:

$$CZ:GY=9 \text{ dB} \quad (3)$$

$$DZ:GY=19 \text{ dB} \quad (4)$$

are recorded into the isolation matrix 110.

Since in the present embodiment, the mobile unit 20 can measure twenty four frequencies, and only about eight frequencies are normally used for the MAHO, many more test frequencies can be simultaneously tested.

If at step 112 it is determined that no more measurements are to be 10 taken for the current test frequency(ies), then execution proceeds to step 114. This may be because the call has ended or the call is handed off to another cell. At step 114, a determination is made as to whether to test more test frequencies. In one embodiment, the determination may be made by an elimination process so that a test frequency from every sector of every cell is measured against the sector of the serving cell.

In another embodiment, the determination may be based on a predetermined selection of specific sectors and specific cells to test. For example, the predetermined selection may depend on engineering evaluations, such as a study of which cell sectors may be suspect. Alternatively, the predetermined selection may depend on predetermined cell cluster organizations and/or a previously accumulated isolation matrix. For example, it may be known that there will never be any interference or crosstalk between cells A and E.

In yet another embodiment, the determination may be made by an evaluation process so that once a cell location is determined that has an isolation datapoint below a predetermined limit, then no cell sectors beyond that cell location will be tested. For example, the cell sectors may be selected in a radially extended selection basis. First the sectors in the cells adjacent to the serving cell are tested. In the above example of serving cell G, the cells F, B, C, and H are tested (FIG. 2). For each of the adjacent cell sectors, if their measurements are within a predetermined limit (and thus cannot reuse the same frequency), then the cells adjacent to them are tested. Using the exemplary measurements taken above, cell H would be tested next, but not cell E.

At step 116, the isolation matrix is provided to a frequency planning system. The frequency planning system of the present invention may be similar to a conventional planning system 8 described in FIG. 1. However, by having the isolation matrix 110 updated on a frequent basis, the frequency planning system of the present invention may be triggered to re-allocate frequency use in response to changes in the isolation matrix.

Figure 5:
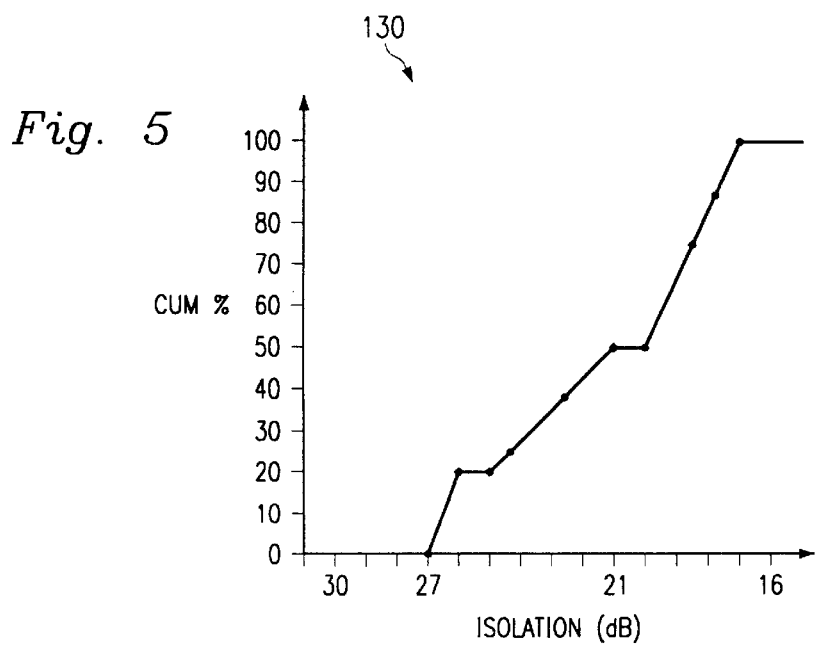
FIG. 5 is an example of a statistical analysis on datapoints measured from the serving cell of FIG. 3.

Referring now to FIG. 5, a graph 130 illustrates the functionality of the automatic frequency planning system according to the present invention. The graph 130 is for a specific test frequency and serving sector. Specifically, the isolation datapoints in the graph 130 are examples for the Y serving sector of cell G (FIG. 3) and the test frequency $f_{3Z}$. The vertical axis represents the cumulative percent of isolation and the horizontal axis represents multiple discrete isolation datapoints for the specific test frequency and serving sector. The following datapoints are included on the graph 130, each taken at one second intervals of each other (the first two isolation datapoints are the same as in equations 2 and 4 in the examples above):

DZ:GY (location P1)=17 dB  (2)

DZ:GY (location P2)=19 dB  (4)

DZ:GY (location P3)=18 dB  (5)

DZ:GY (location P4)=19 dB  (6)

DZ:GY (location P5)=25 dB  (7)

DZ:GY (location P6)=23 dB  (8)

DZ:GY (location P7)=21 dB  (9)

DZ:GY (location P8)=22 dB  (10)

To plot the datapoints from equations 2 and 4–10 above onto the graph 130, each isolation value is to be considered. First, all (100%) of the datapoints in the equations 2 and 4–10 above are greater than or equal to 17 dB. Therefore, the point (17, 100) is plotted on the graph 130. Next, 7 of the 8 (87.5%) datapoints are greater than or equal to 18 dB. Therefore, the point (18, 87.5) is plotted on the graph 130. Next, 6 of the 8 (75%)datapoints are greater than or equal to 19 dB. Therefore, the point (19, 75) is plotted on the graph 130. Next, 4 of the 8 (50%)datapoints are greater than or equal to 20 dB. Therefore, the point (20, 50) is plotted on the graph 130. This continues until a 0% datapoint is obtained, as shown in the graph 130.

To determine if, in the present example, the BSC 12d is isolated from Y sector of cell G, an acceptable percentile of isolation for a predetermined isolation amount must be applied to the graph 130. Also, a predetermined isolation amount must be determined, thereby providing a minimum difference threshold. If the acceptable percentile of isolation is 90% and the predetermined isolation amount is 17 dB, then according to the graph 130, 100% of the datapoints are 17 dB or better. Therefore, the BSC 12d is isolated from the Y sector of cell G.

For a second example using the same set of datapoints of equations 2 and 4–10, the predetermined isolation amount is 21 db. In this example, according to the graph 130, only 50% of the datapoints are 21 dB or better. Therefore, the BSC 12d is not sufficiently isolated from the Y sector of cell G.

Although illustrative embodiments of the invention have been shown and described, other modifications, changes, and substitutions are intended in the foregoing disclosure. Also, the components may be distributed across different platforms and may use different types of messages that achieve the same overall function as the modules and messages discussed above. Accordingly, it is appropriate that the appended claims be construed broadly and in a manner consistent with the scope of the disclosure.

What is claimed is:

1. A method for determining a frequency plan for a wireless communication network, the method comprising the steps of:

broadcasting a reference frequency in a first cell wherein the reference frequency is not used by the network for voice or data communications;

broadcasting a second frequency in a second cell;

instructing a first mobile unit operating in the second cell to measure both the reference and second frequencies and report the measurements;

computing a difference between the measurements of the reference and second frequency; and analyzing the difference to determine frequency isolation, storing the difference in an isolation matrix, repeating the above steps for a predetermined number of cells in the network, and using the isolation matrix to determine the frequency plan for the network.

2. The method of claim 1 wherein the step of instructing includes instructing the first mobile unit to repeatedly measure the reference and second frequencies and report the measurement.

3. The method of claim 1 wherein the step of analyzing utilizes statistical analysis of the computed difference.

4. The method of claim 1 further comprising:

providing a demand matrix for the first cell; and wherein the analyzing utilizes both the demand matrix and the isolation matrix.

5. The method of claim 1 further comprising the step of:

instructing a second mobile unit operating in the first cell to measure both the reference and second frequencies and report the measurements.

6. The method of claim 1 wherein the first and second cells are non-adjacent.

7. The method of claim 1 wherein the wireless communication network utilizes one of either time division multiple access (TDMA) or global systems mobile (GSM) technology.

8. The method of claim 1 wherein the first mobile unit is currently being served by the second frequency.

9. The method of claim 8 wherein the reference frequency is not normally on a measurement order channel list of the first mobile unit and wherein the instructing step adds the reference frequency to the measurement order channel list of the first mobile unit so that the first mobile unit can use a mobile assisted handoff (MAHO) method to measure the reference and second frequencies.

10. The method of claim 9 wherein the instructing step instructs the first mobile unit to use a channel quality message (CQM) to report the measurements.

11. The method of claim 1 wherein the predetermined number of cells is all of the cells in the network.

12. An automatic frequency planning system for use in a multi-frequency wireless communication network, the system comprising:

a first transmitter for broadcasting control signals at a first frequency in a first cell of the network and receiving data from a first mobile unit in the first cell, the control signals instructing the first mobile unit to measure the first frequency as part of an assisted handoff method and provide the measurement of the first frequency as part of the data;

a second transmitter for broadcasting a reference frequency in a second cell of the network, wherein the reference frequency is not used by the network for voice or data communications; and a computing component connected to the first transmitter for receiving and analyzing the data received from the first mobile unit;

wherein the first frequency provides instructions to the first mobile unit to also measure the reference frequency and provide the measurement of the reference frequency as part of the data;

wherein the computing component obtains a measurement difference between the first and reference frequencies and analyzes the difference to determine frequency isolation between the first and reference cell for planning frequency allocation and reuse in the network; and wherein the computing component creates an isolation matrix comprising the measurement difference between the first and reference frequencies for a predetermined number of cells in the network.

13. The system of claim 12 wherein the control signals instruct the first mobile unit to repeatedly measure the first and reference frequencies and provide the measurements as part of the data.

14. The system of claim 12 wherein the computing component analyzes the difference by storing the difference in an isolation matrix.

15. The system of claim 14 wherein the computing component also includes a demand matrix for the first and second cells for planning frequency allocation and reuse of the reference frequency in the network so that the analyzing can use both the demand matrix and the isolation matrix.

16. The system of claim 12 wherein the first transmitter also receives data from a second mobile unit in the first cell, the control signals also instructing the second mobile unit to measure the reference frequency as part of an assisted handoff method and provide the measurement of the reference frequency as part of the data.

17. The system of claim 12 wherein the first and second cells are non-adjacent.

18. The system of claim 12 wherein the wireless communication network utilizes one of either time division multiple access (TDMA) or global systems mobile (GSM) technology.

19. The method of claim 12 wherein the predetermined number of cells is all of the cells in the network.

20. A method for updating a frequency plan for a multi-frequency wireless communication network, the method comprising the steps of:

a) sending out a test frequency from a test cell, wherein the test frequency is not used by the network for voice or data communications;

b) instructing a mobile unit to measure the test frequency in a serving sector of a serving cell, the mobile unit also measuring a serving frequency for the serving cell for assisting in a handoff procedure;

c) providing the measurement of the serving and test frequencies to a computing component;

d) recording a difference between the serving and test frequencies in an isolation matrix;

e) repeating steps a) through d) for a predetermined number of cells in the network, f) using the isolation matrix to update the frequency plan for the network.

21. The method of claim 20 wherein steps a) through d) are repeated at a predetermined time interval for a discrete period of time.

22. The method of claim 20 wherein step b) includes providing the test frequency to a measurement order channel list of the mobile unit.

23. The method of claim 20 wherein the predetermined number of cells is all of the cells in the network.

* * * * *